N. WASHBURN.
Electric Dental-Instrument.
No. 26,388.
Patented Dec. 6, 1859.
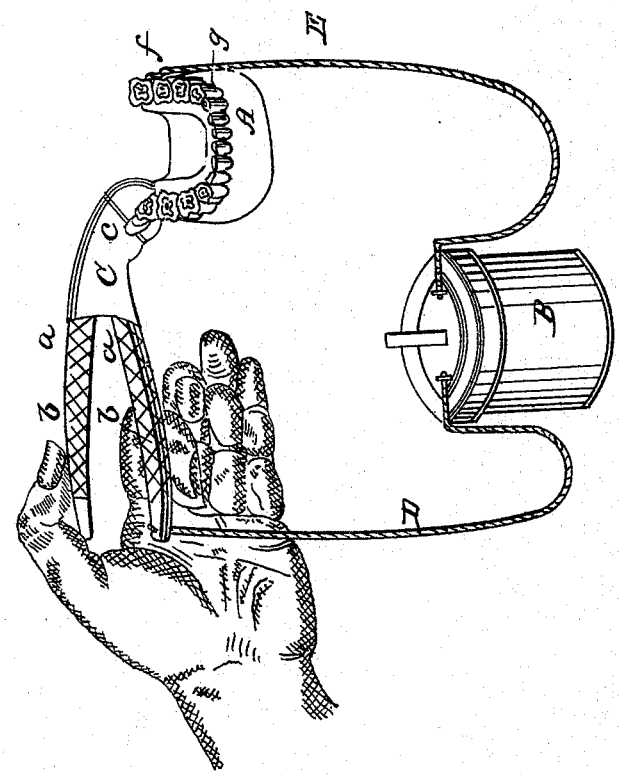
Witnesses
R H Eddy
F P Hale Jr
Inventor
Nahum Washburn

UNITED STATES PATENT OFFICE.

NAHUM WASHBURN, OF BRIDGEWATER, MASSACHUSETTS.

IMPROVEMENT IN DENTAL APPARATUS FOR RELIEF OF PAIN WHILE OPERATING.

Specification forming part of Letters Patent No. 26,388, dated December 6, 1859.

*To all whom it may concern:*

Be it known that I, NAHUM WASHBURN, of Bridgewater, in the county of Plymouth and State of Massachusetts, have invented an Improvement in Surgery; and I do hereby declare that the same is fully described and represented in the following specification.

The object of my improvement is to afford to a person more or less relief from pain during the extraction of a tooth performed on such person. For this purpose I employ, in connection with the instrument used, an electric circuit, and produce the electricity therefor by a friction electrical machine or galvanic battery, or a magnetic electrical apparatus, preferring the latter.

In the performance of an operation I make the surgical instrument used a part of the circuit—that is to say, I attach it to one of the circuit-wires of the battery or electrical machine, so that the current of electricity produced by such battery or electrical machine may flow through such instrument and into the part or portion of the body against which such instrument is to be used, the other wire of the circuit being applied to some other part of the body, either near to or far from the part to be operated on, as circumstances may require.

In extracting a tooth the forceps or instrument may be arranged in the circuit, so that the electric current may pass from such instrument and into the part operated on. In this way the surface or part against which the surgical instrument is made to act, or the part immediately surrounding the same, may be made to receive electricity and to be more or less benumbed, whereby the pain of the operation may be alleviated. I have discovered, and practically demonstrated by numerous experiments, that electricity applied under such circumstances may be employed to great advantage in preventing or alleviating pain, having extracted teeth with little or no suffering to the patients operated on.

In the process of extracting a tooth I generally allow the forceps to remain on the tooth and the electricity to flow through it for a short period of time before attempting to draw the tooth, such being in order to render the nerve or nerves of the jaw and tooth sufficiently benumbed for the operation of extraction.

The application of electricity through the instrument used has advantages over its employment in other ways, as by such a method of applying it it is caused to act with certainty and the most intensity on the part touched by the instrument, its benumbing thus always exerted at the point or spot required.

In the application of the circuit-wire to an instrument so that the latter or parts thereof may compose part of the circuit it will be evident that the portion of the instrument which is to be grasped by the operator should be insulated from the circuit, so as to prevent the electricity from being directed from its proper course. For this purpose such part held in the hand may be covered with silk or other suitable non-conductor of electricity.

The drawing herewith presented exhibits a perspective view of the mode of procedure to extract a tooth.

In this drawing, A denotes the jaw of a person.

B is the galvanic battery or generator of electricity.

C is a pair of extracting-forceps, having their handles $a\,a$ covered with silk $b$ and their joint covered with a tubular covering, $c$, of vulcanized india-rubber.

D and E are the circuit-wires, leading respectively from opposite poles of the battery, one of them being fastened to the metal of the forceps, while the other is attached to a small button or knob, $f$, which is pressed against the gum $g$ of the jaw. In this way the electric current will be caused to flow through the tooth and its nerves of sensation.

I claim—

1. The combination of dental forceps or instrument for operating upon teeth with electro-magnetic mechanism, substantially as described, or its equivalent, so that the electrical current or currents may be made to flow through the nerve or nerves of the tooth, or the jaw or flesh immediately contiguous thereto, in order to benumb the same or render such more or less insensible to pain during the performance of the dental operation.

2. The application of the electrical apparatus to the dental instrument, so that the latter may be in or form part of the circuit, as specified.

In testimony whereof I have hereunto set my signature this 29th day of October, A. D. 1856.

NAHUM WASHBURN.

Witnesses:
ELI WASHBURN,
THOMAS P. RODMAN.